(12) United States Patent
Abdo et al.

(10) Patent No.: US 8,575,513 B2
(45) Date of Patent: Nov. 5, 2013

(54) RAPID PROTOTYPING OF CERAMIC ARTICLES

(75) Inventors: Zafir A. Abdo, Orlando, FL (US);
Ahmed Kamel, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 1958 days.

(21) Appl. No.: 11/481,744

(22) Filed: Jul. 6, 2006

(65) Prior Publication Data
US 2008/0008894 A1 Jan. 10, 2008

(51) Int. Cl.
*B23K 26/00* (2006.01)

(52) U.S. Cl.
USPC ............. 219/121.66; 219/121.65; 219/121.85

(58) Field of Classification Search
USPC ............. 219/121.66, 121.65, 121.85; 419/10; 164/271
See application file for complete search history.

(56) References Cited

U.S. PATENT DOCUMENTS

| | | | |
|---|---|---|---|
| 4,787,362 A | 11/1988 | Boucher et al. | |
| 4,863,538 A * | 9/1989 | Deckard | ........................ 264/497 |
| 5,011,823 A | 4/1991 | Jin et al. | |
| 5,041,261 A * | 8/1991 | Buljan et al. | ..................... 419/11 |
| 5,047,386 A | 9/1991 | Hed | |
| 5,250,136 A | 10/1993 | O'Conner | |
| 5,465,780 A | 11/1995 | Muntner et al. | |
| 5,545,003 A | 8/1996 | O'Conner et al. | |
| 5,641,014 A | 6/1997 | O'Conner et al. | |
| 5,810,552 A | 9/1998 | Frasier | |
| 6,071,363 A | 6/2000 | O'Conner et al. | |
| 2003/0062145 A1 | 4/2003 | Frasier et al. | |
| 2004/0140078 A1* | 7/2004 | Liu et al. | ......................... 164/34 |
| 2004/0144476 A1 | 7/2004 | Fukuta et al. | |
| 2004/0202542 A1 | 10/2004 | Cunha et al. | |
| 2004/0231822 A1 | 11/2004 | Frasier et al. | |
| 2005/0205232 A1* | 9/2005 | Wang et al. | .................... 164/361 |

FOREIGN PATENT DOCUMENTS

| | | |
|---|---|---|
| GB | 2 105 624 A | 3/1983 |
| JP | 56037820 A | 4/1981 |
| WO | WO 2004/089851 | 10/2004 |

* cited by examiner

*Primary Examiner* — Alexandra Elve

(57) ABSTRACT

A method for forming ceramic articles for prototypes that involves the use of metal particles or metal-coated ceramic particles that are formed into ceramic articles using a laser engineered net shaping process. The metal particles or metal coating on the ceramic particles facilitates bonding between the ceramic particles to enable quick manufacture of ceramic articles using the laser engineered net shaping process. The ceramic articles may be ceramic core prototypes and may be used in a variety of different industries.

9 Claims, 2 Drawing Sheets

RAPID PROTOTYPING OF CERAMIC ARTICLES

FIELD OF THE INVENTION

This invention is directed generally to methods of forming ceramic articles, and more particularly to methods of forming ceramic article prototypes.

BACKGROUND OF THE INVENTION

It is becoming important that casting patterns and their associated tools be developed faster in free-form, at lower cost, having superior surface finish and/or requiring little or no remachining. Although there are technologies that are currently used for forming ceramic articles, each has significant disadvantages that fail to meet all of the objectives.

For ceramic prototypes, the prior art has relied on complex processes to form these objects. These methods include the pressing of ceramic powders with subsequent sintering and machining into a final shape. Ceramic objects of this type may include mold shells that are used in casting. Nevertheless, this process is also slow and expensive.

Another method is selective laser sintering. Selective laser sintering (SLS) is a powder-based layer additive manufacturing process generally meant for rapid prototyping. Laser beams, either continuous or pulse mode, are used as a heat source for scanning and joining powders in predetermined sizes and shapes of layers via a polymer binder. The geometry of the scanned layers corresponds to the various cross-sections of the computer-aided design (CAD) models. A drawback of SLS is that additional powder at the boundaries is often hardened and remains attached to the part, thereby requiring additional finishing steps to remove the unwanted material. Furthermore, an inert atmosphere is often required, increasing the cost of the equipment.

Other prior methods include direct or indirect sintering processes. In a direct metal-laser-sinter process, the process operates essentially in the same manner as SLS, except that no binder is required. In this method, the ceramic is directly sintered by the laser.

Another prior art system is a fused deposition modeling system. The fused deposition modeling (FDM) system was designed to create prototype parts using thermoplastic or wax filaments. With this system, the filament is fed through the nozzle where it is heated just above its solidification temperature. The heated filament is then deposited onto the previous layers where it solidifies, forming the part. The movement of the heated nozzle is controlled by a sliced CAD model. In the ceramic FDM process, the filament is produced from a mixture of ceramic powder and binder material. The ceramic-binder filament is used in the equipment in the same manner as the thermoplastic filament. After a green part is formed from the ceramic-binder filament, the binder is removed by conventional means and the resulting ceramic parts are sintered to high density. In this method, the binder has to be removed and the resulting ceramic parts are sintered to high density.

Yet another prior art method is 3-D printing. 3-D printing uses a drop on demand jetting technology that is similar to ink jet printing. In this method the devices deposit a binder onto a powder bed. As the binder solidifies, a layer of solid geometry is created. As in FDM, the binder has to be removed and the resulting ceramic parts are sintered to high density.

Still another method is laminated object manufacturing (LOM). The LOM system normally uses thin sheets of paper to build up a wood-like component. The system is adapted to work with engineered ceramic materials using tape-cast ceramic sheet materials suitable for lamination. During the LOM build process, a laser, controlled by the machine's software, cuts the part cross-section onto a ceramic tape. A new layer of material is laminated to the previous cut layer. The process is repeated until the part is finished.

Accordingly, what is needed is a method of ceramic core prototypes that is faster than prior art methods. Also what is needed is a method of forming ceramic core prototypes that provides greater flexibility in changing the design of the ceramic core after formation. Also what is needed is a method of forming ceramic core prototypes that may be used in the formation of many different ceramic core articles or ceramic articles in general.

SUMMARY OF THE INVENTION

The present invention provides a method of rapid prototyping of ceramic cores to form prototypes that may be used in a wide variety of industries in which ceramic articles are utilized. The methods involve the utilization of metal particles mixed with ceramic particles or metal-coated ceramic particles that are formed into ceramic core prototypes using a laser engineered net shaping process. The methods of the present invention are able to reduce casting development time substantially as compared to prior art methods and/or provide flexibility to change the design of the ceramic core without committing to any tooling.

In one aspect, the present invention provides a method for forming a ceramic article including the steps of providing a powder comprising a ceramic powder and at least one metallic material, applying a laser energy source to the powder to melt the at least one metallic material to enhance bonding of the powder and form the ceramic article, removing the at least one metallic material, and sintering the ceramic article. The metallic material may be added in the form of metal powders or a metal coating on the ceramic powder.

In another aspect, the present invention provides a ceramic article made by a method including the steps of providing a powder comprising a ceramic powder and at least one metallic material, applying a laser energy source to the powder to melt the at least one metallic material to enhance bonding of the powder and form the ceramic article, removing the at least one metallic material, and sintering the ceramic article.

These and other embodiments are described in more detail below.

BRIEF DESCRIPTION OF THE DRAWINGS

Other objects, features and advantages of the present invention will become apparent upon reading the following detailed description, while referring to the attached drawings, in which.

DETAILED DESCRIPTION OF THE INVENTION

Figure 1:
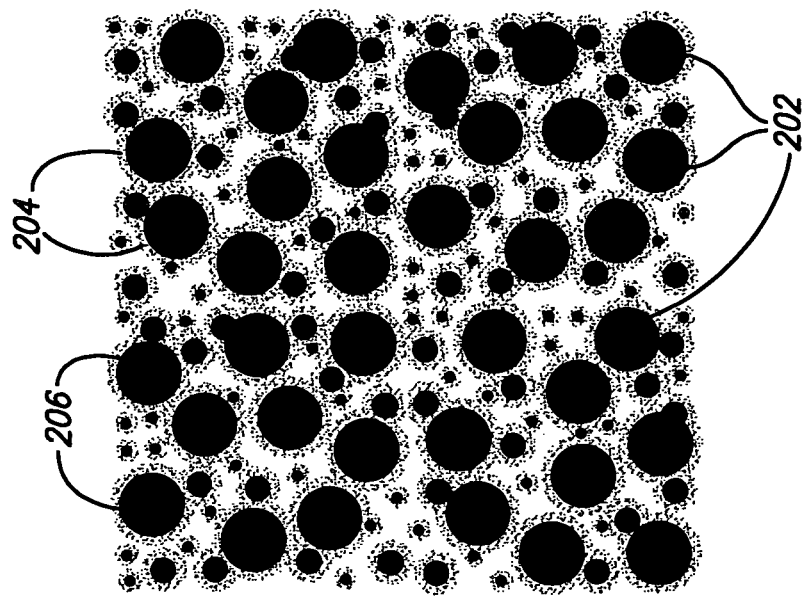
FIG. 1 shows an example of a ceramic-metal powder mix according to one embodiment of the present invention.

The present invention is more particularly described in the following description and examples that are intended to be illustrative only since numerous modifications and variations therein will be apparent to those skilled in the art. As used in the specification and in the claims, the singular form "a," "an," and "the" may include plural referents unless the context clearly dictates otherwise. Also, as used in the specification and in the claims, the term "comprising" may include the embodiments "consisting of" and "consisting essentially of."

The present invention provides a method and system for rapid prototyping three-dimensional, net shape ceramic articles from a variety of powdered materials. The methods of the present invention utilize a laser engineered net shaping (LENS) process to form the ceramic articles. The LENS process forms three dimensional ceramic parts by delivering a powder having metal contained therein into the path of a high power laser beam. The laser is used to melt an area on a substrate while a nozzle delivers the powder to the molten weld pool. The nozzle may be stationary and the build platform may be translatable over the X/Y plane. The method produces a bead, with successive layers built by adding beads on top of the previously deposited bead to form the ceramic article.

Prior art systems of using lasers to form ceramic articles have, heretofore, been unable to use a LENS process. The present invention overcomes these difficulties through the incorporation of a metallic material into the ceramic powder to aid in the formation of the ceramic prototypes. The metallic material may act as a binder for the ceramic particles. This metallic material may be added in any manner that enables the metal to be melted during the LENS process to bind the ceramic particles together to enable formation of the ceramic article. Alternatively, the ceramic powders may be treated in a manner that permits a LENS process to form the selected ceramic article.

In one embodiment, the ceramic article is formed by using metal powder as the metallic material. In this embodiment, metal powder is added to the ceramic powder to form a mixture, with the metal powder acting as the binder. The LENS process is then used with this mixture to form the selected ceramic article. Then, the remaining metallic material is removed and the ceramic article sintered to form the ceramic prototype.

The amount of metal powder added to the ceramic powder may vary depending on one or more factors including, but not limited to, the metal powder used, the ceramic powder used, the type of laser used, and/or the ceramic article to be formed. In general, the amount of metal powder added is an amount sufficient to permit a LENS process to form the selected ceramic article by binding the ceramic particles during the LENS process. In one embodiment, the metal powder is added in an amount of from about 0.1% to about 15%, by volume, of the total volume of the metal powder/ceramic powder mixture. In an alternative embodiment, the metal powder is added in an amount of from about 2% to about 10%, by volume, of the total volume of the metal powder/ceramic powder mixture. It is to be understood, however, that additional metal powder may be used as needed.

The type of metal powder used may be any metal that is capable of being melted by a laser to permit formation of the selected ceramic article. In one embodiment, one metal powder is used. In an alternative embodiment, two or more different metal powders may be used. As the metal powder is being melted and acts as a binder, in select embodiments, the metal is a low melting-point non-ferrous alloy. Examples of low melting-point non-ferrous alloys that may be used in the present invention include, but are not limited to, aluminum and bronze.

The ceramic powder used in the present invention may be any ceramic powder that may be used to form ceramic articles in general, and ceramic core prototypes in specific. Examples of ceramic powders that may be used in the present invention include, but are not limited to, cerium oxide, graphite, silicon, alumina, zirconia, glass, ferrites, silicon carbide, silicon nitride, sapphire, cordierite, mullite, magnesium oxide, zirconium oxide, boron carbide, aluminum oxide, tin oxide, cryolite powders, scandium oxide, hafnium oxide, yttrium oxide, spinel, garnet, lanthanum fluoride, calcium fluoride, boron nitride, steatite, lava, aluminum nitride, iron oxide, quartz, porcelain, forsterite or combinations thereof, as well as any other crystalline inorganic nonmetallic material or clay.

The size of the metal particles and/or ceramic particles used in the present invention may vary depending on a variety of factors. In one embodiment, powders having a particle size in the range of about 0.1 to about 100 microns may be utilized. In an alternative embodiment, powders having a particle size in the range of about 5 to about 50 microns may be utilized.

Reference will now be made to FIG. 1, which depicts one embodiment of a metal powder/ceramic powder mixture according to the inventive aspects of the present invention. In FIG. 1, a mixture is formed that includes a plurality of metal particles 102 and a plurality of ceramic particles 104. As may be seen, a majority of the mixture is ceramic particles as the metal particles generally contain 15% or less of the volume of the mixture. As previously discussed, the types of metal particles and ceramic particles that may be used may vary.

Once the mixture has been subjected to the LENS process, substantially all of the remaining metal powder and the metal binder may be removed. This may be accomplished using any process capable of removing metal from a ceramic article. For instance, the metal may be removed prior to sintering of the ceramic article. In an alternative embodiment, the metal may be removed during sintering of the ceramic article.

In an alternative embodiment, the ceramic article is formed by using metal-coated ceramic particles, with the metal coating operating as the metallic material. In this embodiment, the metal coating is applied to ceramic particles to form metal-coated ceramic particles. The LENS process is then used with these particles to form the selected ceramic article. Again, the metal coating acts as a binder to bind the ceramic particles together to form the selected ceramic article. Again, once the LENS process is complete, the metal is removed and the article sintered to form the ceramic article.

As with the metal powders, the type of metal that may be used to coat the ceramic particles may be any metal that is capable of being melted by a laser to permit formation of the selected ceramic article. In one embodiment, one metal is used in the metal coating. In an alternative embodiment, two or more different metals are used in the metal coating. As with the metal powders, in beneficial embodiments, the metal coating includes a low melting-point non-ferrous alloy.

As previously discussed, the ceramic powder used for the metal-coated ceramic particles may be any ceramic powder that may be used to form ceramic articles in general, and ceramic core prototypes in specific. Examples of ceramic powders that may be used in the present invention include, but are not limited to, cerium oxide, graphite, silicon, alumina, zirconia, glass, ferrites, silicon carbide, silicon nitride, sapphire, cordierite, mullite, magnesium oxide, zirconium oxide, boron carbide, aluminum oxide, tin oxide, cryolite powders, scandium oxide, hafnium oxide, yttrium oxide, spinel, garnet, lanthanum fluoride, calcium fluoride, boron nitride, steatite, lava, aluminum nitride, iron oxide, quartz, porcelain, forsterite or combinations thereof, as well as any other crystalline inorganic nonmetallic material or clay.

The thickness of the metal coating on the ceramic particles may vary depending on a variety of factors including, but not limited to, the ceramic material used, the metal or metals used, the intended ceramic article, the type of laser used in the process, or a combination thereof. In general, the thickness of the metal coating is sufficient to enable the metal-coated particles to be bonded to one another during a laser engineered net shaping process. In one embodiment, the metal coatings are from about 0.01 to about 1 micron in thickness. In an alternative embodiment, the metal coatings are from about 0.05 to about 0.3 microns in thickness.

Figure 2:
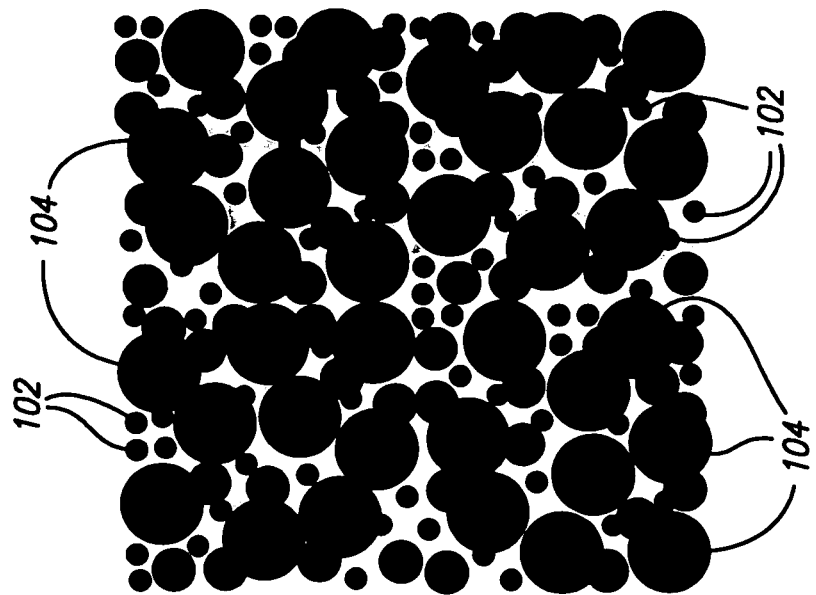
FIG. 2 shows an example of metalized ceramic powder particles according to an alternative embodiment of the present invention.

Reference will now be made to FIG. 2, which depicts one embodiment of a metal-coated ceramic powder according to certain inventive aspects of the present invention. In FIG. 2, a plurality of metal-coated particles 202 are shown and having a metal coating 204 on a ceramic particle 206. The ceramic powder particles can be chemically or thermally treated to create a metallic/depleted or transformed zone at the edges of the ceramic particles to enhance the binding of the powder during the LENS process. As previously discussed, the types of metals used in the coatings and the types of ceramic particles that may be used may vary.

Again, once the LENS process has been completed, the at least a portion, if not substantially all of the remaining metal coating and/or metal binder may be removed and the ceramic article may be sintered.

Once the selected mixture of metal particles and ceramic particles or metal-coated ceramic particles is chosen to form the ceramic article, a laser engineered net shaping process is applied to these particles to form the selected article. As previously discussed, the powder with the metal contained therein is placed into the path of a high power laser beam that is used to melt an area on a substrate while a nozzle or other means delivers the powder to the molten weld pool.

Figure 3:
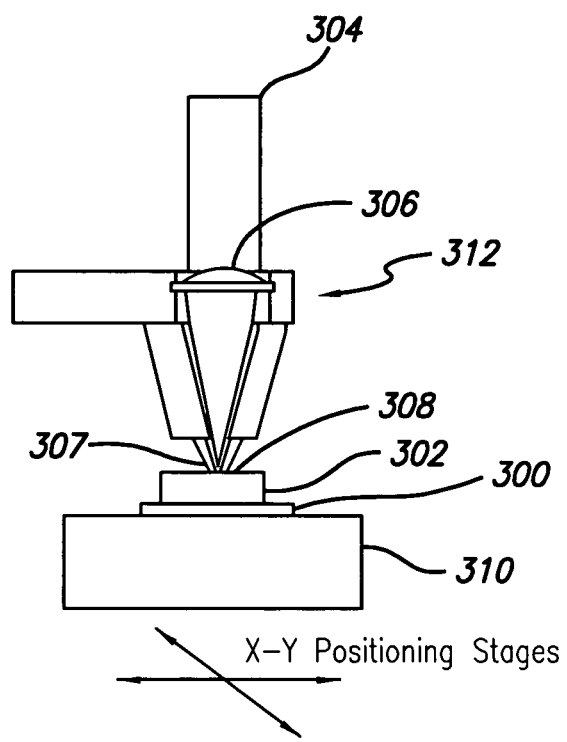
FIG. 3 shows a schematic representation of one embodiment of a laser engineered net shaping process that may be used in the present invention.

A schematic representation of one embodiment of the present invention is set forth in FIG. 3. In this process, a substrate 300 is used as a base onto which new material 302 is deposited. This new material 302 may include a mixture of ceramic particles and metallic particles or metallic-coated particles. A laser 304 is focused by a lens 306 onto the substrate 300 to create a molten puddle 308 and additional material 307 may be injected into the puddle 308 either by gravity, or by using a pressurized carrier gas. The substrate 300 is moved relative to the laser beam 304 in a controlled fashion to deposit thin metallic lines of a finite width and height. A stage 310 may be used to provide relative motion between the work piece and the deposition head 312 in orthogonal directions. Lines of material may then be deposited side by side in the selected regions to create the pattern for each layer. In this fashion, each layer may be built up line by line and the entire object may be formed, layer by layer. An inert shroud gas may be used to shield the melt pool from atmospheric oxygen for better control of properties, and/or to promote layer to layer adhesion by providing better surface wetting.

The laser used in the present invention may be any laser with sufficient power and/or absorption to melt the metallic particles or metal-coated particles to form the ceramic object. The type of laser used may vary depending on the metallic material used in the present invention. Examples of lasers that may be used in the present invention include, but are not limited to, a pulse neodymium: yttrium-aluminum-garnet (Nd: YAG) laser, a $CO_2$ laser, or a continuous wave (CW) Nd: YAG laser.

The methods of the present invention may be used to form any ceramic article. In one embodiment, the ceramic article is a ceramic core prototype. The ceramic articles formed by the methods of the present invention of the present invention may be used in a wide variety of different industries and applications. Examples of industries and/or applications that may use the ceramic articles of the present invention include, but are not limited to, automotive, aerospace, shipbuilding, and/or railway industries, as well as selected areas of nanotechnology. In addition, these ceramic articles may be used in the power generation industry, such as, for example, the production of parts used in generators.

The foregoing is provided for purposes of illustrating, explaining, and describing embodiments of this invention. Modifications and adaptations to these embodiments will be apparent to those skilled in the art and may be made without departing from the scope or spirit of this invention.

We claim:

1. A method for forming a ceramic article comprising the steps of:
   providing a powder comprising a ceramic powder and at least one metallic material forming a coating on the ceramic powder;
   applying a laser energy source to the powder to melt the at least one metallic material forming the coating to bond the powder and form the ceramic article;
   removing at least a portion of the at least one metallic material forming the coating; and
   sintering the ceramic article.

2. The method of claim 1, wherein the metallic material is a metallic powder and is mixed with the ceramic powder in an amount of from about 0.1 to about 15% by volume of the total volume of the mixture.

3. The method of claim 2, wherein the metallic material is a metallic powder and is mixed with the ceramic powder in an amount of from about 2 to about 10% by volume of the total volume of the mixture.

4. The method of claim 2, wherein the at least one metallic powder is a low melting-point non-ferrous alloy.

5. The method of claim 1, wherein the ceramic powder is selected from cerium oxide, graphite, silicon, alumina, zirconia, glass, ferrites, silicon carbide, silicon nitride, sapphire, cordierite, mullite, magnesium oxide, zirconium oxide, boron carbide, aluminum oxide, tin oxide, cryolite powders, scandium oxide, hafnium oxide, yttrium oxide, spinel, garnet, lanthanum fluoride, calcium fluoride, boron nitride, steatite, lava, aluminum nitride, iron oxide, quartz, porcelain, forsterite, or a combination thereof.

6. The method of claim 1, wherein the laser energy source is selected from a pulse neodymium: yttrium-aluminum-garnet laser, a $CO_2$ laser, or a continuous wave neodymium: yttrium-aluminum-garnet laser.

7. The method of claim 1, wherein the ceramic article is a ceramic article prototype.

8. The method of claim 7, wherein the ceramic article prototype is a ceramic core.

9. The method of claim 1, wherein the metallic material is removed during sintering of the ceramic article.

* * * * *